United States Patent
Freeman

(10) Patent No.: US 8,125,319 B2
(45) Date of Patent: Feb. 28, 2012

(54) APPARATUS AND METHOD FOR RETURN NOTIFICATION FOR STAND-ALONE EQUIPMENT

(75) Inventor: Curtis Freeman, Andover, MA (US)

(73) Assignee: Koninklijke Philips Electronics NV, Eindhoven (NL)

( * ) Notice: Subject to any disclaimer, the term of this patent is extended or adjusted under 35 U.S.C. 154(b) by 1201 days.

(21) Appl. No.: 10/574,185

(22) PCT Filed: Sep. 21, 2004

(86) PCT No.: PCT/IB2004/051815
§ 371 (c)(1),
(2), (4) Date: Mar. 30, 2006

(87) PCT Pub. No.: WO2005/036490
PCT Pub. Date: Apr. 21, 2005

(65) Prior Publication Data
US 2007/0117464 A1    May 24, 2007

Related U.S. Application Data

(60) Provisional application No. 60/509,193, filed on Oct. 7, 2003.

(51) Int. Cl.
*G08B 1/00* (2006.01)
*G04F 1/00* (2006.01)

(52) U.S. Cl. .................. 340/309.16; 368/97; 368/98

(58) Field of Classification Search ............ 368/10, 368/97, 98; 340/568.1–572.9, 825.36, 825.49, 340/309.7, 526, 531, 146.2, 500–513, 539.11, 340/679, 680, 693.5, 309.16, 539.1
See application file for complete search history.

(56) References Cited

U.S. PATENT DOCUMENTS

| 3,933,231 | A  | * | 1/1976  | Vinet .......................... 194/241 |
| 4,624,578 | A  | * | 11/1986 | Green ........................... 368/10 |
| 5,283,546 | A  | * | 2/1994  | Scop et al. .................... 340/287 |
| 5,283,550 | A  |   | 2/1994  | MacIntyre |
| 5,877,676 | A  | * | 3/1999  | Shankarappa .............. 340/309.7 |
| 6,317,045 | B1 | * | 11/2001 | Suzuki ........................ 340/571 |
| 6,320,505 | B1 | * | 11/2001 | Scott .......................... 340/568.1 |
| 6,708,879 | B2 | * | 3/2004  | Hunt ............................ 235/385 |
| 2002/0084887 | A1 | * | 7/2002 | Arshad et al. ............... 340/5.61 |
| 2002/0091575 | A1 | * | 7/2002 | Collart ........................ 705/22 |
| 2002/0158751 | A1 | * | 10/2002 | Bormaster ................. 340/10.2 |
| 2002/0184122 | A1 | * | 12/2002 | Yamaguchi et al. ........... 705/30 |
| 2005/0156740 | A1 | * | 7/2005 | Maloney .................... 340/572.1 |

FOREIGN PATENT DOCUMENTS

GB    2 340 262 A    2/2000
WO    WO 01/11514 A    2/2001

* cited by examiner

Primary Examiner — Jennifer Mehmood
(74) Attorney, Agent, or Firm — W. Brinton Yorks, Jr.

(57) ABSTRACT

The apparatus and method of the present invention provide an automatic notification 105 produced by a standalone equipment 100 to indicate that the equipment 100 is due to be returned to an issuing organization or individual. Only the issuing organization or individual has the capability to reset 104 or disable the automatic notification 105. Return notification comprises visual 107 108 and/or audible 106 components that are triggered by the expiration of a timer 102 204. Optionally, for non-essential equipment, the equipment is disabled 109 until reset 104 by the issuing organization or individual.

18 Claims, 3 Drawing Sheets

APPARATUS AND METHOD FOR RETURN NOTIFICATION FOR STAND-ALONE EQUIPMENT

CROSS REFERENCE TO RELATED APPLICATION

This application claims the benefit of U.S. provisional application Ser. No. 60/509,193 filed Oct. 7, 2003, which is incorporated herein.

The present invention relates to the return of borrowed standalone equipment. More particularly, this invention relates to an apparatus and method for an automatic notification produced by the standalone equipment to indicate that it needs to be returned to an issuing organization or individual.

Any standalone equipment can be loaned out or borrowed from an organization or individual that has responsibility for the equipment. Often, this equipment does not find it's way back to the responsible organization or individual. This may be due the convenience of continued use by the borrower, the owner forgetting who the borrower was, or the borrower forgetting who it was borrowed from.

Prior art techniques include attaching stickers to equipment that states something similar to "Please return to the XXX" or "Property of YYYY". Sign out books are an example of honor system approaches that have been used. Some prior art systems simply disable or lockout a device when someone attempts to use the device. For example, password access for a laptop computer is necessary or the complete functionality may not be available or just file access may be limited. An example of a key controlled access is the key for an automobile that grants access to its utility.

The apparatus and method of the present invention provide an automatic notification produced by a standalone equipment to indicate that it is due to be returned to an issuing organization or individual. Only the issuing organization or individual has the capability to reset or disable the automatic notification. Return notification comprises visual and/or audible components that are triggered by the expiration of a timer.

Thus, a preferred embodiment of the system and method of the present invention provides a way to actively inform a person that equipment is borrowed and is due for return. In an alternative preferred embodiment, so long as the equipment is not essential to life, further use of the equipment is prevented by the system and method of the present invention disabling the equipment.

The foregoing and other features and advantages of the invention will be apparent from the following, more detailed description of preferred embodiments as illustrated in the accompanying drawings in which reference characters refer to the same parts throughout the various views.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Figure 1:
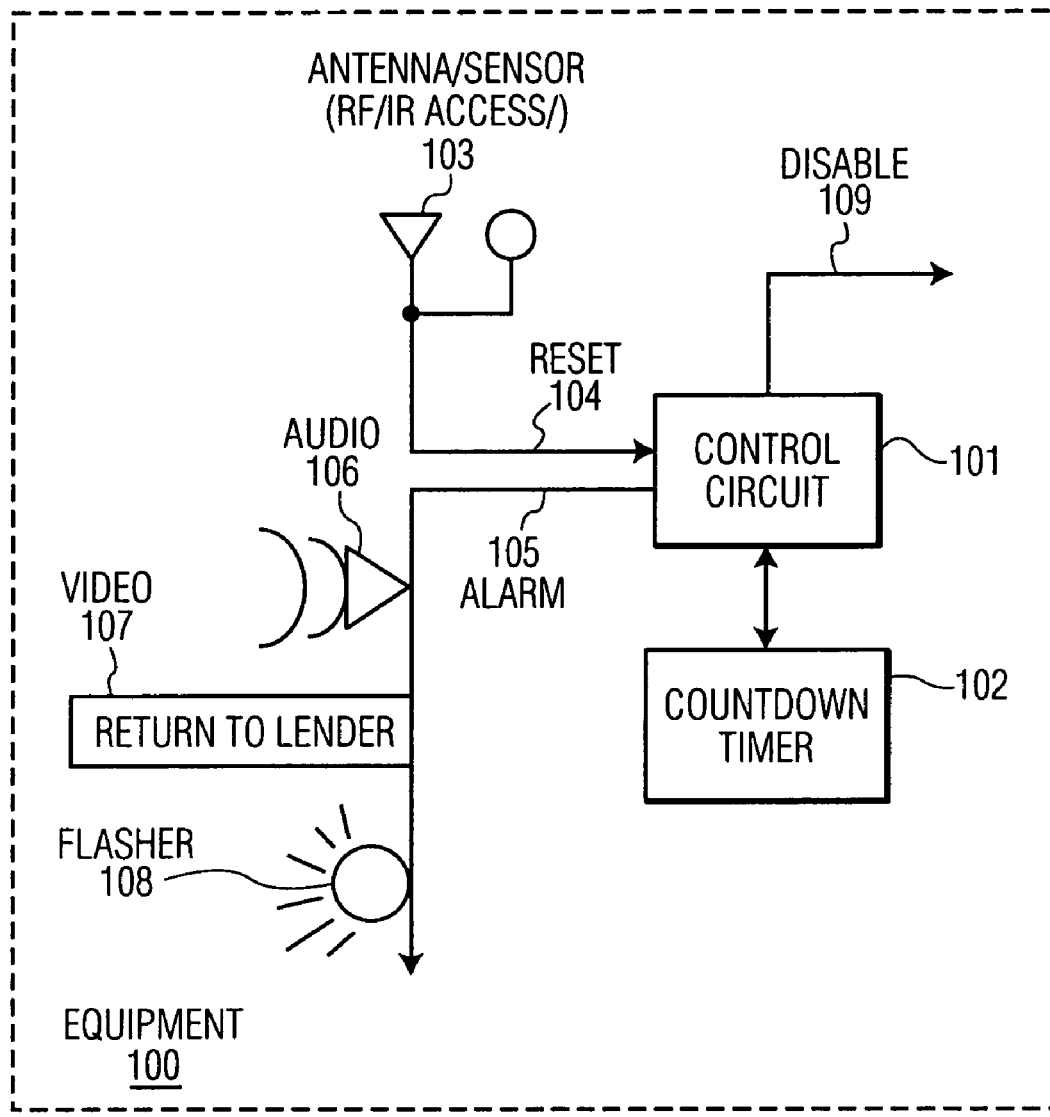
FIG. 1 is a is a simplified block diagram illustrating the architecture of a standalone equipment whereto am RF embodiment of the present invention is applied.

FIG. 1 is a representative equipment whereto RF embodiments of the present invention are to be applied.

In a preferred embodiment, an audible notification is trigged, such as a beep, when a preset timeout occurs. This mode of automatic notification is possible in many equipments that have a "soft" off or sleep mode, so that there is sufficient power for minimal processing to occur while the equipment is "off" in order to detect the expiration of a timer and trigger an audible indicator. Some equipment, particularly those powered strictly from line current, provide an alarm when turned on and display text stating "Please return to the Organization XXXX or call extension individual at xxxx." or some similar message. In an alternative embodiment, voice output exists on the equipment, and a verbal message augments or replaces the text or beep. In yet another embodiment, all or some of the notification is suppressed until a user powers on the equipment.

In a preferred embodiment, some equipment, such as medical instruments, require an implementation of the apparatus and method of the present invention in which return notification occurs, but can be dismissed temporarily so the equipment can be used. A defibrillator is an example of this. Lifesaving therapy is never be denied, so the defibrillator continues to be operable even after a return timeout has occurred. Other instruments, an oscilloscope may be an example, may be blocked from further use until returned to the proper owner where the notification timer can be reset.

In a preferred embodiment, any of a number of mechanisms is used to reset the notification. For example, a software controlled "password" or a mechanical key that activates a switch are used to reset the timer in preferred embodiments of the present invention.

The invention builds in a configurable return mechanism into non-networked devices. Various and optionally progressive levels of reminder alarms are generated by the device, encouraging the borrowing party to return the device rather than to simply ignore the device. In a preferred embodiment for a non-essential equipment, one of strict password protection or a lockout mechanism eliminates further benefit of borrowed device to a user. However, because such a silent mechanism does not encourage proper return of the device, preferred embodiments incorporate at least one of an audio and visual reminder alarm to the borrowing party to return the borrowed equipment.

In a preferred embodiment, there are a number of possible constructions that can be employed to implement the method of the present invention, which can comprise the steps of:

1. Configuring the reminder alarm timeout and progression;
2. Arming the reminder alarm timeout;
3. Generating a sequence of progressive reminder alarms; and
4. Resetting the timer upon return-to-home.

Figure 2:
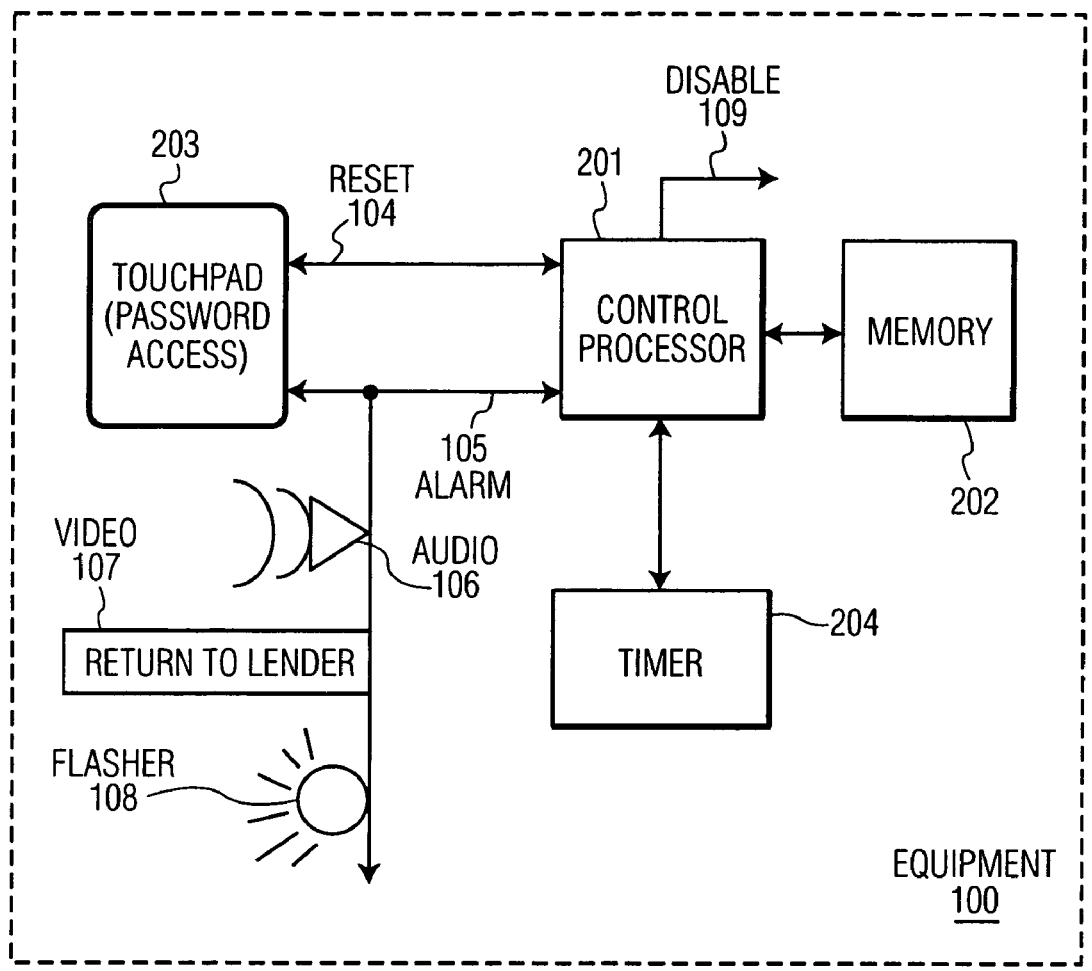
FIG. 2 is a is a simplified block diagram illustrating the architecture of a standalone equipment whereto a touchpad embodiment of the present invention is applied.
Figure 3:
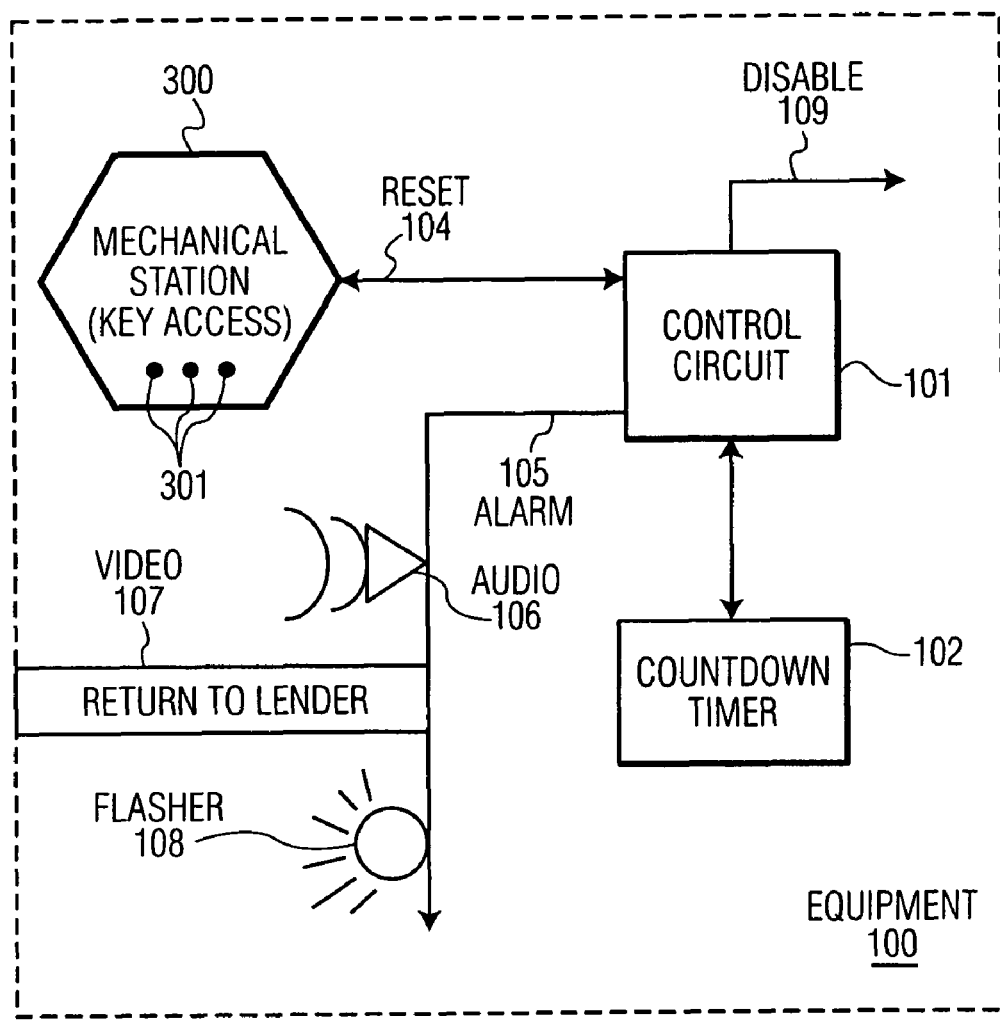
FIG. 3 is a is a simplified block diagram illustrating the architecture of a standalone equipment whereto a mechanical base station embodiment of the present invention is applied.

FIGS. 1-3 illustrate preferred embodiments for constructions of the present invention, but are provided to demonstrate and explicate the present invention rather than limit it these embodiments. It should be noted that all of the method steps are required in these preferred embodiments and the steps that are required depend on not only the capabilities of the equipment to which the invention is attached but also to the particular embodiment's capabilities for setting, resetting and producing alarms of various types. However, one skilled in the art will realize that the combinations of capabilities presented are only a few of those possible within the spirit of the claimed invention.

In a preferred embodiment, as illustrated in FIG. 1, equipment comprises a radio frequency RF embodiment of the present invention wherein the equipment has a "home" transmitter area with a transmitter that broadcasts via RF signals. Equipment 100 within the "home" transmitter area further comprises a countdown timer 102 that is continuously reset 104 until the equipment leave the "home" transmitter area and the countdown timer 102 is no longer reset and begins to countdown. A return to the "home" transmitter area automatically resets the countdown timer 102. In this embodiment, an RF antenna 103 receives signals from the "home" that reset 104 the alarm 105 under the control of a control circuit 101. When the equipment 100 is out of range of the "home" transmitter the control circuit 101 no longer resets the countdown time 102. When the countdown time 102 reaches zero the control circuit 101 enables an alarm 105. The alarm is at least one of an audio signal or beep, a video message 107, a flashing light (e.g., LED) 108. The intensity and frequency of the alarm can be varied from continuous and monotone to highly random and increasing, under the control of the control circuit 101. If the equipment is not essential, in an alternative preferred embodiment the control circuit 101 disables 109 the equipment 100 when the countdown timer 102 reaches zero.

Another alternative embodiment employs infrared transmitted by a "home" transmitter and replaces the antenna 103 with an IR sensor, but otherwise functions identically to the RF embodiment illustrated in FIG. 1 and just described. In an embodiment in which equipment comprises a infrared (IR) embodiment of the present invention, the equipment has a "home" transmitter area with a transmitter that broadcasts via IR signals. Equipment 100 within the "home" transmitter area further comprises a countdown timer 102 that is continuously reset 104 until the equipment leave the "home" transmitter area and the countdown timer 102 is no longer reset and begins to countdown. A return to the "home" transmitter area automatically resets the countdown timer 102. In this embodiment, an IR sensor replaces the RF antenna 103 and receives signals from the "home" that reset 104 the alarm 105 under the control of a control circuit 101. When the equipment 100 is out of range of the "home" transmitter the control circuit 101 no longer resets the countdown time 102. When the countdown time 102 reaches zero the control circuit 101 enables an alarm 105. The alarm is at least one of an audio signal or beep, a video message 107, a flashing light (e.g., LED) 108. The intensity and frequency of the alarm can be varied from continuous and monotone to highly random and increasing, under the control of the control circuit 101. If the equipment is not essential, in an alternative preferred embodiment the control circuit 101 disables 109 the equipment 100 when the countdown timer 102 reaches zero.

FIG. 2 illustrates a self-contained automatic return notification embodiment of the present invention. A touchpad 203 serves as an input device for resetting the timer 204 to a predetermined value by a control processor 201. The control processor accepts input from the touchpad 203, optionally under password control, and stores the password and an optional input timer reset value in a memory 202. The touchpad 203, in an preferred embodiment, can be used to turn off the alarm 105 under password control and to vary the intensity and frequency and type of alarm, e.g., the video message 107 can be input via the touchpad 203. When the timer 204 reaches zero the control processor 201 enables an alarm 105. The alarm is at least one of an audio signal or beep 106, a video message 107, and a flashing light (e.g., LED) 108. The intensity and frequency of the alarm 105 can be varied from continuous and monotone to highly random and increasing, under the control of the control processor 201. If the equipment is not essential, in an alternative preferred embodiment the control processor 201 disables 109 the equipment 100 when the timer 204 reaches zero.

In an alternative preferred embodiment, a mechanical base station 203 requiring a key for access, performs the same functions as the previously described "home" transmitter, but requires human interaction to reset the timer alarm 102. Buttons 301 serve as an input device for resetting the timer 102 to a predetermined value by a control processor 101. The control circuit 101 accepts input from the button 301 under key control. The button 301, in a preferred embodiment, can be used to turn off the alarm 105 under key control and to vary the intensity and frequency and type of alarm, e.g., a button 301 is provided for each time of alarm included and repetitive depression of the button varies the intensity and frequency of the associated alarm. When the timer 2102 reaches zero the control circuit 101 enables an alarm 105. The alarm is at least one of an audio signal or beep 106, a video message 107, and a flashing light (e.g., LED) 108. The intensity and frequency of the alarm 105 can be varied from continuous and monotone to highly random and increasing, under the control of the control circuit 101. If the equipment is not essential, in an alternative preferred embodiment the control circuit 101 disables 109 the equipment 100 when the timer 102 reaches zero.

In every embodiment, generating a reminder alarm or reminder alarm sequence 105 is a function of the capabilities of the equipment. In preferred embodiments reminder alarms comprise any combination of a progression of simple tones or beeps that vary in intensity and frequency, screen displays that vary in color and intensity and blink rate, and recording playbacks that vary in intensity and frequency.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt the teaching of the present invention to a particular equipment and usage situation without departing from its central scope. Therefore it is intended that the present invention not be limited to the particular embodiments disclosed as the best mode contemplated for carrying out the present invention, but that the present invention include all embodiments falling within the scope of the appended claims.

What is claimed is:

1. A method for notification of return of equipment having at least one function to a home station, comprising the steps of:

providing said equipment with an integral reminder alarm and reminder alarm timeout for return of the equipment to the home station, said reminder alarm timeout having a default timeout configuration;

optionally configuring the reminder alarm timeout configuration at the home station;

arming the reminder alarm timeout; and when the timeout expires, generating the reminder alarm from the equipment to return the equipment to the home station; providing said home station as a mechanical key reset device that resets the reminder alarm when mechanically engaged with said reminder alarm; and including a key controller in said provided reminder alarm that resets said reminder alarm to said default timeout configuration on mechanical engagement with the mechanical key reset device.

2. The method of claim 1, further comprising the step of upon return of the equipment to the home station, resetting the reminder alarm timeout configuration to said default configuration.

3. The method of claim 1, wherein the generating step further comprises the step of when the equipment is not essential, disabling the at least one function of the equipment.

4. The method of claim 1, wherein:
the providing step further comprises providing a default reminder alarm progression;
the configuring step further comprises optionally configuring the progression for said reminder alarm; and
the generating step further comprises generating a sequence of progressive reminder alarms according to said configured progression.

5. The method of claim 4, wherein said configuring step further comprises setting the progression to one of an incremental increase and random variation in at least one of the intensity of the reminder alarm and frequency of the reminder alarm.

6. The method of claim 1, wherein said generating step further comprises generating the reminder alarm as at least one repetition of at least one of an audio tone, an audio message, a visual signal, and a video text message.

7. The method of claim 6, wherein:
the providing step further comprises providing a default reminder alarm progression;
the configuring step further comprises optionally configuring the progression for said reminder alarm; and
and the generating step further comprises generating said at least one repetition as a sequence of progressive reminder alarms according to said configured progression.

8. The method of claim 1, further comprising the steps of:
providing said home station as a touchpad input device that accepts a password input via the touchpad;
inputting a password via said touchpad; and
resetting said reminder alarm to said default timeout configuration on input of a predetermined password.

9. The method of claim 1, further comprising the steps of:
providing said home station as one of an infrared transmitter and a radio frequency transmitter, having a given range that continually transmits a reminder alarm reset signal; and
including a corresponding one of an infrared sensor and a radio frequency receiver in said provided reminder alarm that resets said reminder alarm to said default timeout configuration on receipt of said transmitted reset signal,
wherein said reminder alarm is continually reset whenever said equipment is within the given range of the home station.

10. An apparatus for notification that equipment having at least one function is due for return to a home station, comprising:
a reminder alarm to the integral to the equipment for notification that the equipment is due for return to the home station, said reminder alarm having a default timeout configuration;
a timeout device; and
a control device to
optionally configure the reminder alarm timeout configuration at the home station, and
arm the timeout device with the configured timeout, and
when the timeout expires, generate a reminder alarm to return the equipment to the home station, said alarm generating according to the timeout configuration;
said home station is a mechanical key reset device that resets the reminder alarm when mechanically engaged with said reminder alarm; and said reminder alarm further comprises a key controller that resets said reminder alarm to said default timeout configuration on mechanical engagement with the mechanical key reset device.

11. The apparatus of claim 10, wherein said control device is further configured to upon return of the equipment to the home station, reset the reminder alarm timeout configuration to said default timeout configuration.

12. The apparatus of claim 10, wherein said control device is further configured to when the equipment is not essential, disable the at least one function of the equipment.

13. The apparatus of claim 10, wherein:
the reminder alarm timeout configuration further comprises a default reminder alarm progression;
the control device is further configured to:
optionally configure the progression for said reminder alarm, and
generating a sequence of progressive reminder alarms according to said configured progression.

14. The apparatus of claim 13, wherein said control devices is further configured to set the progression to one of an incremental increase and random variation in at least one of the intensity of the reminder alarm and frequency of the reminder alarm.

15. The apparatus of claim 10, wherein said control device is further configured to generate the reminder alarm as at least one repetition of at least one of an audio tone, an audio message, a visual signal, and a video text message.

16. The apparatus of claim 15, wherein the control device is further configured to:
provide a default reminder alarm progression;
optionally configure the progression for said reminder alarm; and
generate the at least one repetition as a sequence of progressive reminder alarms according to said configured progression.

17. The apparatus of claim 10, wherein:
said home station is a touchpad input device that accepts a password input via the touchpad; and
said control device is further configured to reset said reminder alarm to said default timeout configuration on input of a predetermined password via the touchpad.

18. The apparatus of claim 10, wherein:
said home station is one of an infrared transmitter and a radio frequency transmitter, having a given range and that continually transmits a reminder alarm reset signal; and
said reminder alarm further comprises a corresponding one of an infrared sensor and a radio frequency receiver that resets said reminder alarm to said default timeout configuration on receipt of said transmitted reset signal,
wherein said reminder alarm is continually reset whenever said equipment is within the given range of the home station.

* * * * *